US007276115B1

(12) United States Patent
Cathey

(10) Patent No.: US 7,276,115 B1
(45) Date of Patent: Oct. 2, 2007

(54) CONFORMABLE COATING

(76) Inventor: Timothy D. Cathey, 401 W. Aycock St., Raleigh, NC (US) 27608

( * ) Notice: Subject to any disclaimer, the term of this patent is extended or adjusted under 35 U.S.C. 154(b) by 0 days.

(21) Appl. No.: 10/894,099

(22) Filed: Jul. 17, 2004

Related U.S. Application Data

(60) Provisional application No. 60/488,026, filed on Jul. 17, 2003.

(51) Int. Cl.
*C04B 11/00* (2006.01)
(52) U.S. Cl. .................. 106/772; 106/778; 106/779; 106/780; 428/404
(58) Field of Classification Search ............... 106/772, 106/778, 779, 780; 428/404
See application file for complete search history.

(56) References Cited

U.S. PATENT DOCUMENTS

| 3,696,559 | A | * | 10/1972 | Hatton ........................... 47/9 |
| 3,950,179 | A | * | 4/1976 | Schneider ................. 106/205.8 |
| 3,973,051 | A | * | 8/1976 | Buckley et al. ............. 426/574 |
| 4,022,633 | A | * | 5/1977 | Schneider ................. 106/205.8 |
| 4,819,933 | A | * | 4/1989 | Armond ....................... 472/92 |
| 4,827,665 | A | * | 5/1989 | Hubbs et al. ..................... 47/9 |
| 4,867,614 | A | * | 9/1989 | Freed ......................... 405/263 |
| 5,232,698 | A | * | 8/1993 | Hord |
| 5,234,916 | A | * | 8/1993 | Hord |
| 5,338,549 | A | * | 8/1994 | Hord et al. |
| 5,422,101 | A | * | 6/1995 | Daggy et al. ............. 424/78.01 |
| 5,516,524 | A | * | 5/1996 | Kais et al. ................... 424/439 |
| 5,746,546 | A | * | 5/1998 | Hubbs et al. ............... 405/263 |
| 5,955,123 | A | * | 9/1999 | Daggy |
| 6,800,129 | B2 | * | 10/2004 | Jardine et al. ............... 106/724 |
| 2003/0152689 | A1 | * | 8/2003 | Ethington, Jr. et al. |
| 2004/0161435 | A1 | * | 8/2004 | Gupta |
| 2005/0089543 | A1 | * | 4/2005 | Weiser ....................... 424/410 |
| 2005/0100535 | A1 | * | 5/2005 | Farmer et al. ........... 424/93.46 |

* cited by examiner

*Primary Examiner*—Paul Marcantoni
(74) *Attorney, Agent, or Firm*—Ishman Law Firm P.C.

(57) ABSTRACT

A conformable coating for application to a soil substrate for barrier, adhesive, and planting properties includes a mixture of recycled or virgin materials, including organic fibrous material from wood based material and cotton based material, and gypsum bearing materials to which an effective amount of psyllium and its processes derivatives are added to form a solids mixture, which is diluted with an amount of water sufficient to provide a flowable consistency.

15 Claims, No Drawings

CONFORMABLE COATING

RELATED APPLICATION

This application claims the benefit of U.S. Provisional Application No. 60/488,026 filed on Jul. 17, 2003 in the name of Timothy D. Cathey and entitled "Conformable Coating".

FIELD OF THE INVENTION

The present invention relates to conformal coatings and, in particular to an aqueous coating system incorporating psyllium husks and its process derivatives in a flowable form that incorporates available materials, including indigenous and recycled materials, to conform to substrate contours for barrier, adhesive, planting and load bearing applications.

BACKGROUND OF THE INVENTION

The present invention relates to an aqueous coating using substantial recycled materials and incorporating an effective amount of psyllium seed husks and processing derivatives high in mucilage content. The coating is processed to a flowable form and when applied, by spraying or dispersing, conforms and adheres to intervening contours.

The psyllium format used in the present invention is derived from several members of the plant genus *Plantago*, preferably *P. ovata* also referred to as Blond Psyllium. Of particular utility are the constituents derived from the seed husks or hulls, in particulate form, as well as the byproducts from the processing in the form commonly referred to as kha-kha powder or Psyllium industrial dust. Both have a high swell volume of around 20 times, and a swell rate of about 20 ml/g to 65 ml/g and above. As hereinafter used, the term "psyllium husk and byproducts" (PHB) encompasses the high mucilage/swell volume products, alone or in combination, from the *Plantago* species. Such products are readily commercially available under Harmonized Tariff Number 1211.90.80.20 and FDA Product Code 54 I Y R 02.

The coatings of the invention have particular benefit in soil and ground applications, wherein the coating may be used in agricultural applications for controlling unwanted plant growth, terrain applications for limiting erosion, planting applications for supporting or retarding target species growth, and load bearing applications for facilitating vehicle and personnel traffic. The coatings are sprayed or dispersed as thin self leveling coatings to required thickness for the application.

The *Plantago* species in other roughly processed forms have been proposed for varying soil based applications.

As disclosed in U.S. Pat. No. 3,696,559, the seeds of *Plantago* or other sources are processed to a gum, mixed with mulch and applied in wet or dry form to soil surfaces to protect against water and wind erosion, reduce soil moisture loss and enhance seed germination.

The dried and ground plants of the Plantago family have also been proposed for conditioning soils as disclosed in U.S. Pat. No. 4,827,665. Therein, the plant material was tilled into the soil and wetted to substantial depths and thereafter compacted. Suggested applications include ground cover, sports fields, and highway berms and embankments.

A further soil stabilization approach is disclosed in U.S. Pat. No. 5,746,546 wherein psyllium in an undisclosed formal is dry mixed with plastic fiber and aggregate, and applied to soil contours such as golf bunkers. The applied mixture is wetted and when hardened is claimed to prevent distortion and disfiguration of shape. The psyllium disclosed is said to have a swell volume of 25-45% suggesting a plant based particulate format of the type used in the inventor's above mentioned U.S. Pat. No. 4,827,665, inasmuch as psyllium husk powder as used in the present invention has a swell volume orders of magnitude greater. The disclosed application rates of the psyllium format are such, that if psyllium husk powder were used, the cost would be prohibitive.

None of the above proposed applications, however, disclose or suggest the use of the psyllium husk and/or byproducts as a conformal coating system and wherein the characteristics may be augmented by select additives to improve upon and extend beneficial uses therefor.

DESCRIPTION OF THE PREFERRED EMBODIMENTS

The present invention comprises a base coating system that is formulated from a mixture of recycled or virgin materials, including organic fibrous material preferably wood based material and cotton based material, and gypsum bearing materials to which an effective amount of PHB is added to form a solids mixture, which is diluted with an amount of water sufficient to provide a flowable consistency for the selected application.

Suitable wood based materials are wood pulp materials including old newsprint, mixed waste paper, boxboard, corrugated board and similar materials. Suitable cotton based materials are fibrous materials including cotton mill waste, gin trash, gin motes, or post consumed cotton products, which are cleaned, refined and sized to a sufficient extent to remove unwanted seed hulls, DNA and plant remnants to provide the cotton fiber. Gypsum can be obtained from conventional sources and must be screened and dressed to the proper particulate size.

This basic formulation may include various additives, as described below, for improving properties for specific applications. Such additives including agents for bacterial protection, elasticity, hydrophilicity, oil capturing, surface finish, durability, lubricity bulking, seed germinating, seed germination retarding, moderating water penetration, moderating material wetting, altering surface traction, and imparting thixotropic characteristics.

A starting mixture will contain by weight a major portion of the recycled or virgin materials to which a minor portion of PHB is added. By way of example, a satisfactory starting mixture comprises by weight old newsprint in an amount of about 20% to 70%, gypsum in the amount of about 15% to 70%, and cotton in the amount of about 5 to 60%, and PHB in the amount of about 0.25% to 40%. The foregoing dry materials are mixed with liquid to provide a flowable vehicle at a range of less than 1% to 27% solids. Preferably the newsprint is shredded, the gypsum pulverized, the cotton in fibrous form, and the PHB in powder form. Water-based liquids are preferred. The pH of the mixture is preferably maintained within or conventionally adjusted to a range of about 3.5 to 8.0.

The base formulation provides a high solids content, self-leveling after application, moderate skin strength and resistance, and moderate biodegradability. These characteristics may be modified by the additives discussed below.

The base formulation is well suited for adhesive applications. By way of example, 47% old newsprint, 28% gypsum, 12% cotton and 13% psyllium were mixed by weight with 40 parts water to form a tacky like consistency. The mixture was applied to a base layer of paper-based material and overlapped with a top layer of paper-based material to form a multi-layer substrate. The resulting product was used as a bedding material for poultry and maintained layer adhesion when exposed to resultant normal moisture and material conditions. The base formulation also functions as an effective mulch barrier for suppressing underlying weeds and overlying and preventing penetrating weed seed growth. The skin absorption characteristics also inhibit top layer seed growth.

The foregoing mixture may be supplemented with a citrus peel oil such as orange, lemon, lime and the like. In minor amounts of 0.25 to 25%, the oil when mixed with PHB assists in increasing the absorbed water making the mixed product more granular thereby providing additionally lubricity under pumping and spray application. The peel oil also functions as an antibacterial and antifungal agent.

The lubricity and pumping pressure of the base mixture may also be increased by the addition of minor amounts of kelp of about 0.02% to 6%, in chopped or shredded form. The addition acts as a blowing agent by promoting outgassing and enabling a higher solids content discharge.

Compounds containing elements of column 1a and 2a of the periodic table in soluble form, particularly magnesium and calcium, may be used to increase the bound water in the coating system. The addition in minor amounts of about 0.5% to 10% improves adhesion and cohesion characteristics providing a conformal coating having increased flexibility and reduced shrinkage. Magnesium sulfate is preferred.

Compounds containing elements of column 1a and 2a of the periodic table in soluble form, preferably potassium, may be added as anti-wetting agents resulting in a coating with reduced bound water and providing a dryer surface. Such coatings demonstrate an ability to retain seeds without germination enabling target seed species to be deposited awaiting natural or artificial water application. Potassium Sulfate is a suitable addition.

Polysaccharides in the form of simple sugars and/or corn starch, preferably uncooked, together with the compounds containing elements of column 1a and 2a of the periodic table discussed above impart thixotropic properties to the mixture. The corn starch addition in the amount of 1% to 10% improves the pumping characteristics as well as increasing the solids content thereof. The applied coating also exhibits reduced biodegradability, reduced top seed germination, reduced shrinkage and improved vertical shear strength. Simple sugars, preferably sucrose, in the amount of 0.5% to 12% significantly increases the bound water producing a matrix less subject to drying and providing a surface favorable to seed germination.

For use in conjunction with economic animals and poultry, a deodorizing agent may be added to the base mixture. Magnesium oxide in particular has been found effective in binding the ammonium content of chicken manure.

The foregoing is demonstrated by the following examples.

EXAMPLE 1

An effective mulch that provided extended weed protection for crops in tilled soil included a sprayable mixture comprising an aqueous solution with about a 5.6% solids content of 59% old newspaper, 24% gypsum, 16% cotton fiber, 5.8% psyllium husk powder, 1% orange peel extract, 0.1% kelp, and 1.9% magnesium sulfate. The resultant barrier conformed to existing soil topography, and resisted environmental moisture and wind conditions without rupture or fragmentation.

EXAMPLE 2

The formulation also functions as a conformal load-bearing surface with sufficient strength for supporting vehicular traffic and/or retaining varying terrain materials depending on the size and type of aggregate or other filler. Such a mixture was sprayed over a vehicle pathway through wooded terrain comprised of gravel, dirt, organic debris, sand and the like. After drying, the underlying substrate was intimately adhered to the membrane and supported vehicle travel. The mixture was applied in multiple layers at the rate of about 0.08 lbs per sq. ft. The base layer comprised a sprayable mixture of 5.1% solids consisting of 51% old news print, 22% gypsum, 13% cotton fiber, 7% psyllium husk powder, 0.1% citric extract, 2.0% corn starch, 0.1% kelp, and 5% magnesium sulfate. A top layer comprised 48% old newsprint, 29% gypsum, 12% cotton fiber, 4% psyllium, 0.1% citric extract, and 4% magnesium sulfate. A top coating of calcium carbonate particles and psyllium powder was sifted over the top surface for improving traction.

EXAMPLE 3

The mixture also functions as a slope retaining barrier layer for soil grades, and sand formations. Coatings of the disclosed ranges with the paper, gypsum, cotton and psyllium contents were applied in a spray mode over sand formations in a coastal environment. The coatings remained intact over an extended period when subjected to tidal motion whereas similar structures without the coating were readily eroded.

The use of a saline aqueous solution containing psyllium has also been determined to establish an erosion resistant conformal coating on said formations, such as dunes or shores, using proximate indigenous materials. Therein, psyllium husk powder was mixed into an indigenous volume of saline water. The resulting mixture was applied directly as a coating over the discrete sand formations, and resisted tidal erosion over an extended period. The mixture may also be mixed with available sand to form a flowable mixture for dispersion on the target formations, or may be formed into discrete forms placed on the shore lines and serving to dissipate to erosive effects of tidal movement.

EXAMPLE 4

A planting mulch barrier providing extended weed protection for crops in tilled soil included a sprayable mixture comprising an aqueous solution with about a 5.5% solids content of 33% old newspaper, 46% gypsum, 20% cotton fiber, 0.2% psyllium husk powder, and 0.02% orange peel extract. The resultant barrier conformed to existing soil topography, and prevented weed growth upwardly therethrough.

EXAMPLE 5

A conformal coating exhibiting thixotropic properties included a sprayable mixture comprising an aqueous solution with about 5.5% solids content by weight of 25% old newsprint, 45% gypsum, 20% cotton fiber, together with 0.23% psyllium husk powder, 0.02% orange peel extract, 5.4% unbaked corn starch, and 1.4% magnesium sulfate.

EXAMPLE 6

The coatings of the invention may also be applied in single and multiple layers in a seed matrix that contains sufficient available water for supporting seed germination without supplemental watering. Initially, an area of ground was tilled and contoured. A first layer aqueous solution of 5.8% solids content of 33% old newsprint, 49% gypsum, 11% cotton fiber, 3.4% psyllium husk powder, 0.04% shredded kelp, 1.6% magnesium sulfate, and 5.3% simple sugar was prepared to which a first quantity of centipede grass seed was added. The first layer aqueous solution was spray applied to the area. Thereafter a second layer aqueous solution of 3.6% solids content was prepared comprising 33% old newsprint, 47% gypsum, 10% cotton fiber, 3.3% psyllium husk powder, 0.4% shredded kelp, 1.7% magnesium sulfate, and 5% simple sugar. A corresponding amount of seed was added and spray applied over the first layer. Over a two weed period, seed germination was observed with root structure penetrating the layers into the ground, and no underlayer weed penetration was noted. Supplemental water was not supplied.

EXAMPLE 7

The coatings of the present invention are also effective in layers containing seeds that remain dormant without seed deterioration for extended period prior to germination. Accordingly, the application may take place during a variable time frame, and germination initiated when environmental conditions are more favorable. This enables application during periods where natural or artificial watering is limited and where the target species requires favorable sunlight conditions for growth. A coating providing these benefits was provided in a single layer coating comprising an aqueous solution of 5.8% solids containing 33% old newsprint, 49% gypsum, 11% cotton fiber, 3.5% psyllium husk powder, 3.5% psyllium, 0.04% shredded kelp, 1.8% magnesium sulfate, and 1.1% simple sugar. Red fescue grass seed was added to the mixture which was then applied to tilled and contoured ground. Over a two week period, insubstantial seed germination was noted, and tested sections did not reveal seed degradation. Thereafter, the layer was periodically watered to maintain a damp upper surface. A week later, seed germination was clearly established, with root penetration into the soil through the coating.

The basic and additive formulations above may be further modified with, protein, fat, Ph balancers, electrolytic conductors, coloring compounds, flora additives and anti-flora additives. Ferrous compounds and caustics can be contraindicated.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed is:

1. A coating on a substrate comprising: a solids mixture having by weight about 0.25% to 40% of at least one of psyllium husk and byproducts thereof, 20% to 70% material derived from wood, about 5% to 60% material derived from cotton, and about 15% to 70% gypsum; and sufficient liquid carrier whereby application on the substrate establishes a self leveling conformal layer thereon.

2. The coating as recited in claim 1 wherein said material derived from wood is shredded newsprint, said material derived from cotton is in fibrous form, and said gypsum is pulverized.

3. The coating as recited in claim 1 wherein citrus peel oil is added to said mixture in an amount of about 0.5% to 3% by weight as an antibacterial agent.

4. The coating as recited in claim 1 wherein polysaccharide is added to said mixture by weight in an amount of about 0.5% to 5% as a water binding promoter for said psyllium husk and byproducts thereof.

5. The coating as recited in claim 4 wherein said polysaccharide is sugar.

6. The coating as recited in claim 5 wherein said coating further includes seed for germination thereof.

7. The coating as recited in claim 4 wherein said polysaccharide is corn starch in the amount of about 1% to 15% by weight as a seed germination retardant.

8. The coating as recited in claim 1 wherein said mixture includes kelp in the amount of about 0.1% to 2% by weight as a bulk lubricity agent.

9. The coating as recited in claim 1 wherein said mixture includes sugar in the amount of about 1% to 15% by weight.

10. A seed germinating conformable coating for application over an area of soil comprising: an aqueous mixture having a solids content by weight by of about 3% to 15% and comprised of about 20% to 70% material derived from wood, about 5% to 60% of material derived from cotton, about 15% to 70% of a gypsum material, about 0.25% to 40% high swell rate psyllium products and/or byproducts, a compound selected from the group consisting of Group Ia and IIa of the Periodic Table in the amount of about 0.5% to 10%, and polysaccharide in the amount of about 0.5% to 12%; said mixture having admixed therein a first quantity of seeds for germination.

11. A seed germinating coating for application over an area of soil comprising: an aqueous mixture having a solids content by weight of about 3% to 15% and comprised of about 20% to 70% of material derived from wood, about 5% to 60% of material derived from cotton, about 15% to 70% of a material derived from gypsum, about 0.25% to 40% of at least one of powdered psyllium husks and byproducts thereof, an alkaline earth metal compound of about 1% to 10% and polysaccharide in the amount of about 0.5% to 12%, said mixture having admixed therein a first quantity of seeds for germination.

12. A coating for application to a substrate comprising: an aqueous solution having a solid mixtures comprising by weight about 20% to 70% of material derived from wood, about 5% to 60% of material derived from cotton, and about 15% to 70% material derived from gypsum, and a high mucilage content binder of at least one of psyllium husks and byproducts thereof in the amount of about 0.25% to 40%.

13. The coating as recited in claim 12 including as thixotropic agents an alkaline earth metal compound and corn starch.

14. The coating as recited in claim 13 wherein said alkaline earth metal compound is magnesium sulfate.

15. The coating as recited in claim 13 wherein said corn starch is unbaked.

* * * * *